United States Patent
Gress et al.

(10) Patent No.: US 6,813,507 B1
(45) Date of Patent: *Nov. 2, 2004

(54) UNIFIED MESSAGING SYSTEM HAVING SHORT MESSAGE SERVICE COMMAND PROCESSOR

(75) Inventors: David S. Gress, Mechanicsville, VA (US); Robert Raymond Sealey, Venus Mansion (SG); Robert James Lockwood, Richmond, VA (US)

(73) Assignee: Cisco Technology, Inc., San Jose, CA (US)

(*) Notice: Subject to any disclaimer, the term of this patent is extended or adjusted under 35 U.S.C. 154(b) by 543 days.

This patent is subject to a terminal disclaimer.

(21) Appl. No.: 09/846,224

(22) Filed: May 2, 2001

(51) Int. Cl.[7] .............................................. H04Q 7/20
(52) U.S. Cl. ...................................... 455/466; 370/328
(58) Field of Search ............................. 455/466, 550.1, 455/414.4; 379/88.12; 709/203, 230; 707/2; 370/352–356, 328, 349, 496, 522

(56) References Cited

U.S. PATENT DOCUMENTS

| | | | |
|---|---|---|---|
| 4,837,798 A | | 6/1989 | Cohen et al. |
| 5,802,510 A | * | 9/1998 | Jones .............................. 707/2 |
| 5,832,221 A | * | 11/1998 | Jones ........................... 709/206 |
| 5,978,685 A | * | 11/1999 | Laiho ........................... 455/466 |
| 6,167,429 A | * | 12/2000 | Mercer et al. .............. 709/203 |
| 6,665,378 B1 | * | 12/2003 | Spielman et al. ......... 379/88.12 |

* cited by examiner

Primary Examiner—Jean Gelin
(74) Attorney, Agent, or Firm—Leon R. Turkevich

(57) ABSTRACT

A unified communications system includes an SMS command processor configured for executing prescribed messaging operations based on reception of an SMS message having respective prescribed commands. The SMS command processor is configured for receiving the SMS message based on the SMS message having a prescribed destination that corresponds to the address for the SMS command processor. The SMS message may be generated by the unified messaging subscriber requesting execution of a prescribed messaging operation, or from another agent configured for generating the SMS message based on a prescribed event. The SMS command processor parses the received SMS message for the prescribed command, and executes the prescribed command as necessary. The prescribed command may be defined by the service provider, alternately the prescribed command may be user-defined according to a command table stored in a subscriber profile directory. Hence, SMS messaging users can send SMS messages as a command interface for a unified messaging system, enabling storage and retrieval of unified messages.

46 Claims, 3 Drawing Sheets

UNIFIED MESSAGING SYSTEM HAVING SHORT MESSAGE SERVICE COMMAND PROCESSOR

BACKGROUND OF THE INVENTION

1. Field of the Invention

The present invention relates to unified messaging systems configured for receiving, storing, and supplying messages to a subscriber, independent of message format or the type of device used by the sender of the message or the subscriber accessing the messages.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

Short Message Services (SMS) have been implemented in wireless telephone communications systems as a way to send a message to a subscriber's wireless phone. SMS messages have become quite popular recently, due in part from wireless telephone service providers offering SMS as a free service in conjunction with wireless telephony services; hence, many wireless subscribers have developed a preference to communicating using SMS as opposed to more costly wireless voice services. A messaging server, also referred to as a Short Message Service Center (SMSC), is configured for receiving an SMS message from a messaging source according to Short Message Peer to Peer Protocol (SMPP). The messaging source may be, for example, a cellphone supplying a user-input message, or an e-mail interface resident within the wireless telephone communications system. The SMSC, in response to receiving the SMS message from the messaging source, transmits a short message to the cellular phone based on the destination telephone number specified within the notification message. However, this arrangement still provides only limited flexibility in enabling different sources to send an SMS message to a cellular phone. In addition, existing cellphones are limited by memory to storing up to ten SMS messages. Moreover, this arrangement limits the ability of an SMS subscriber having a cellphone to send messages to a destination that does not have an SMS-capable cellphone.

Unified communications systems are under development as a way of enhancing messaging services for users such as wireless telephone subscribers. A disadvantage of unified communications systems implemented as enhanced versions of the voice mail system, paging system, or e-mail interface resident within the wireless telephone communications system is that such implementation requires detailed knowledge of the proprietary protocols associated with the voice mail systems. Hence, such implementations are available only from switch vendors having knowledge of the proprietary protocols.

Use of a unified communications system implemented independent of the existing proprietary 135 voice mail systems enables service providers to use scalable and distributed systems using recognized communication protocols. Hence, the service providers may use such unified communications systems across multiple platforms, independent of protocol, for storage of various types of messages, for example voice messages, facsimile, and e-mail stored in a centralized messaging store.

Commonly-assigned, copending application Ser. No. 09/739,687, filed Dec. 20, 2000, entitled Unified Messaging System Configured for Management of Short Message Service Type Messages, the disclosure of which is incorporated in its entirety herein by reference, discloses a unified communications system including an SMS module configured for receiving SMS messages according to SMPP protocol. The SMS module obtains source and destination information from the received SMS message, and accesses a subscriber profile directory for subscriber profile information based on at least one of the source and destination information. The SMS module generates a common format message that includes the SMS message, and selectively supplies the common format message to selected destinations based on the accessed subscriber profile information. The common format message may be stored in a prescribed message store, for example an IMAP directory, or output as an e-mail message to a prescribed destination. The SMS module also is configured for selectively supplying stored messages to a unified messaging subscriber as an SMS message based on the profile information on the unified messaging subscriber. Hence, the unified communications system enables SMS messaging users to send SMS messages to non SMS-type devices (e.g., telephones, e-mail clients, etc.) and retrieve stored common format messages (e.g., fax, e-mail, voice messages) using the SMS message system.

Hence, SMS to date has been considered only as a protocol for sending and receiving messages; consequently, efforts have been limited in exploiting the SMS technology as a true communications technology that complements voice communications technology within a unified communications paradigm.

SUMMARY OF THE INVENTION

There is a need for an arrangement that enables open standards-based unified messaging systems to utilize SMS messages as a command interface. In particular, there is a need for an arrangement that enables a unified messaging system to parse executable commands from a received SMS message, enabling unified messaging operations to be performed for an SMS messaging subscriber.

There also is a need for an arrangement that enables a user to perform unified messaging operations, including retrieval of messages, by sending SMS messages to a unified messaging system.

These and other needs are attained by the present invention, where a unified communications system includes an SMS command processor configured for executing prescribed messaging operations based on reception of an SMS message having respective prescribed commands. The SMS command processor is configured for receiving the SMS message based on the SMS message having a prescribed destination that corresponds to the address for the SMS command processor. The SMS message may be generated by the unified messaging subscriber requesting execution of a prescribed messaging operation, or from another agent configured for generating the SMS message based on a prescribed event. The SMS command processor parses the received SMS message for the prescribed command, and executes the prescribed command as necessary; for example, the prescribed command may be defined by the service provider, alternately the prescribed command may be user-defined according to a command table stored in a subscriberprofile directory. Hence, SMS messaging users can send SMS messages as a command interface for a unified messaging system, enabling storage and retrieval of unified messages.

One aspect of the present invention provides a method in a server configured for executing messaging operations. The method includes receiving a short message service (SMS) message, parsing the SMS message for a prescribed messaging command, and executing a prescribed messaging operation based on the prescribed messaging command. The parsing of the SMS message enables prescribed messaging operations to be executed, enabling a user to use SMS messages as a command interface for messaging operations (e.g., retrieve a stored message, delete a message, generate a new message having selected stock quotes, etc.). Hence, the SMS messaging technology serves as an access technology for unified messaging operations, providing greater flexibility for unified messaging subscribers.

Another aspect of the present invention provides a server configured for executing messaging operations. The server includes an interface configured for receiving a short message service (SMS) message according to a prescribed network protocol, and an SMS command processor. The SMS command processor is configured for parsing the SMS message and executing a prescribed messaging operation based on detecting a prescribed messaging command within the SMS message.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
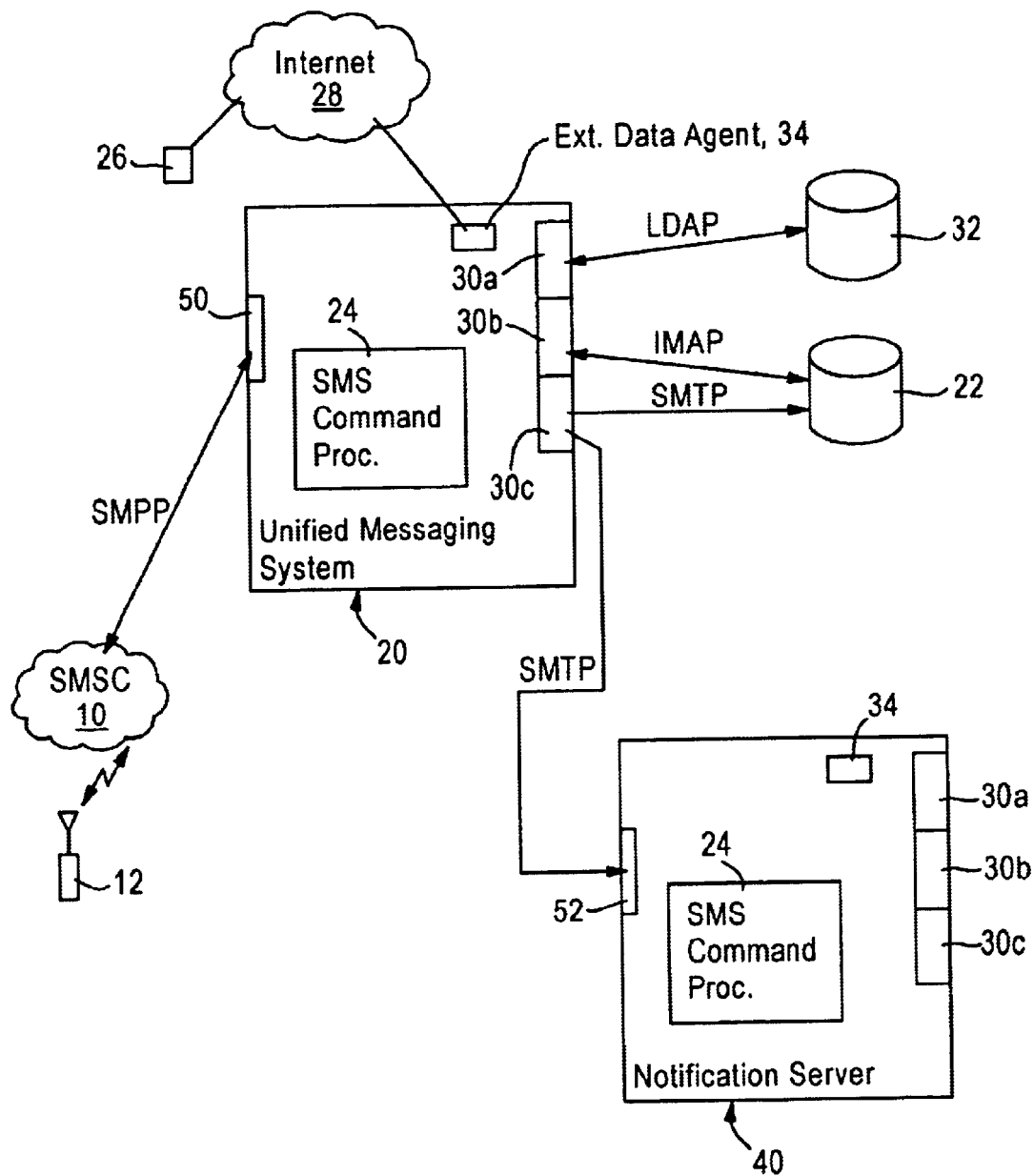
FIG. 1 is a block diagram illustrating a unified messaging system configured for executing messaging operations based on reception of SMS messages, according to an embodiment of the present invention.

FIG. 1 is a block diagram illustrating an architecture that provides unified messaging services via an IP network according to an embodiment of the present invention. The architecture includes an SMSC 10 configured for sending and receiving SMS messages to and from wireless SMS devices 12, and for selectively forwarding SMS messages to peer systems via SMPP protocol. The architecture also includes a unified messaging system 20 configured for receipt, storage, and retrieval of messages stored in a subscriber message store 22, independent of the message type. An exemplary implementation of the unified messaging system 20 is the commercially available Cisco Unified Open Network Exchange (Cisco uOne) (Products UONE-FOUND 4.1S, and UONE-VOICEMSG4.1S) from Cisco Systems, Inc.

The above-incorporated application Ser. No. 09/739,687, discloses an arrangement that enables SMS messages to be managed as true message types that can be received, stored, and retrieved from the unified messaging system 20. The disclosed embodiment further enhances the existing Cisco uOne system by adding within the unified messaging system 20 an SMS command processor 24 configured for sending and receiving SMS messages via SMPP protocol. In particular, the unified messaging system 20 includes an SMPP interface 50 for receiving the SMS messages via SMPP protocol.

Moreover, the SMS command processor 24 is configured for parsing a received SMS message for a prescribed messaging command; if a prescribed messaging command is detected within the SMS message, the SMS command processor 24 is configured for executing a prescribed messaging operation based on the prescribed messaging command. The prescribed messaging operation may include, for example, retrieving a list for the subscriber of stored messages within the subscriber message store 22, deleting a message, or obtaining subscriber-selected external information (e.g., selected stock quotes) from a remote server 26 via an IP-based network such as the Internet 28, etc. In particular, the prescribed messaging operations are executed based on function calls (i.e., procedure calls) by the SMS command processor 24 to independently executable resources (e.g., API's, agents, etc.).

The SMS command processor 24 is configured for accessing standardized application 1:5 programming interfaces (APIs) 30 executable within the unified messaging system 20. Hence, the SMS command processor 24 is able to access an LDAP API 30a for subscriber profile information from a subscriber directory 32 according to LDAP protocol: such subscriber profile information may include subscriber notification preferences, as well as distribution lists established by the subscribers. As described below with respect to FIG. 3, the subscriber profile information also may include user-specific messaging commands, and subscriber selections that enable an executable external data agent 34 to obtain the subscriber-selected external information from the remote server 26.

Hence, the SMS command processor 24 can execute any necessary messaging operation in response to parsing an SMS command from a received SMS message. For example, the SMS command processor 24 may generate multiple SMS messages for respective destinations based on reception of an SMS message that specifies a subscriber distribution list. In addition, the SMS module 24 is able to access the IMAP message store 22 via an IMAP API 30b for storage of SMS messages in a common format recognizable by the IMAP message store 22, enabling the SMS message to the stored and retrieved as part of the unified messages managed by the unified messaging system 20.

The SMS command processor 24 also may utilize an SMTP API 30c to send the appropriate notification message, generated based on execution of the SMS command, to the IMAP message store 22 or a separate notification agent 40, illustrated as a separate notification server 40 having an SMTP interface 52 for receiving e-mail messages. The notification server 40 is configured for generating notification messages to subscribers based on received messages, where the notification messages are sent to a selected subscriber destination device (e.g., voice mailbox, e-mail inbox, SMS capable cellphone, etc.), based on the subscriber notification preferences. Note that the notification server 40 also includes an SMS command processor 24, enabling the notification server 40 to parse an SMS command from an SMS message enclosed as an attachment to a received e-mail message.

Hence, SMS command processing can be performed either by the unified communications system 20, or the notification server 40. Additional details describing the notification server 40 and the arrangement for sending a notification message to a subscriber based on a notification preferences are disclosed in commonly assigned, copending application Ser. No. 09/629,053, filed Jul. 31, 2000, entitled IP-Based Notification Architecture for Unified Messaging, the disclosure of which is incorporated in its entirety herein by reference.

Figure 2:
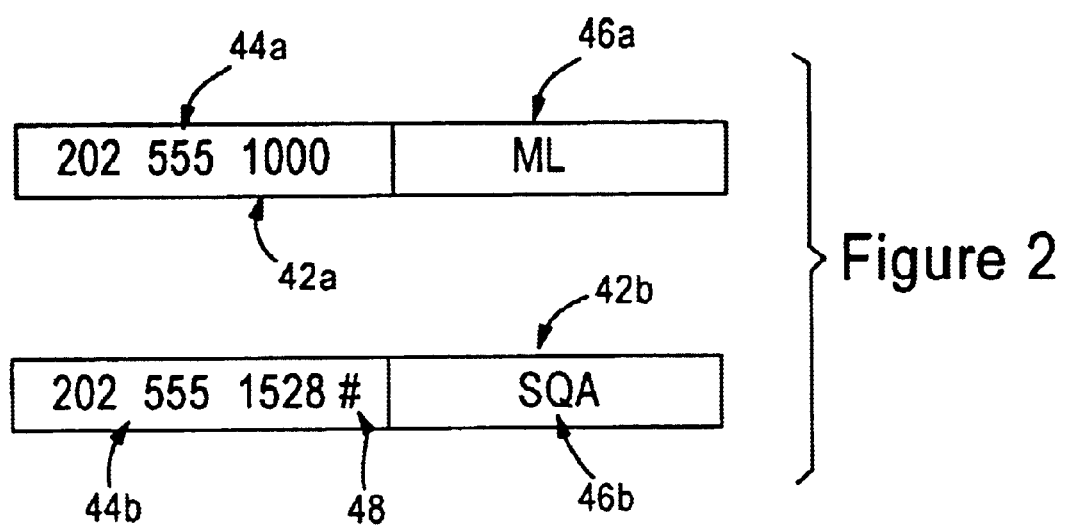
FIG. 2 is a diagram illustrating received SMS messages having messaging commands executable by the SMS command processor of FIG. 1.

FIG. 2 is a diagram illustrating SMS messages 42 (typically composed of unicode text) having a destination number 44 and a prescribed messaging command 46 executable by the SMS command processor 24. Typically the SMS command processor 24 will detect that the SMS message 42 includes a prescribed messaging command 46 based on the destination number 44. In particular, the destination number 44a corresponds to an assigned SMS command processor number, enabling the SMS command processor 24 to identify that it is the intended recipient of the SMS message 42a containing a corresponding generic command 46a (e.g., "ML" specifies retrieve message list from IMAP store 22). Alternately, the destination number 44b may correspond to an authorized SMS subscriber 12; in this case, the SMS command processor 24 will validate the subscriber by accessing the subscriber profile information from the LDAP directory 32, and based on detecting a command tag 48 (e.g., #) within the destination number 44b.

Upon validating the subscriber and detecting the command tag 48, the SMS command processor 24 can execute the command 46; if the prescribed messaging command 46 is not a generic command 46a, but rather a user-specific messaging command 46b, the SMS command processor 24 may decode the user-specific messaging command 46b based on the subscriber attribute information and any subscriber selections specified within the subscriber attribute information. Hence, the user-specific messaging command "SQA" may correspond to requesting a first set of stock quotes, and a user-specific messaging command "SQB" may correspond to requesting a second set of stock quotes, etc.

Hence, a user can request execution of generic or user-specific messaging operations by sending SMS messages containing SMS commands to the SMS command processor 24.

Figure 3:
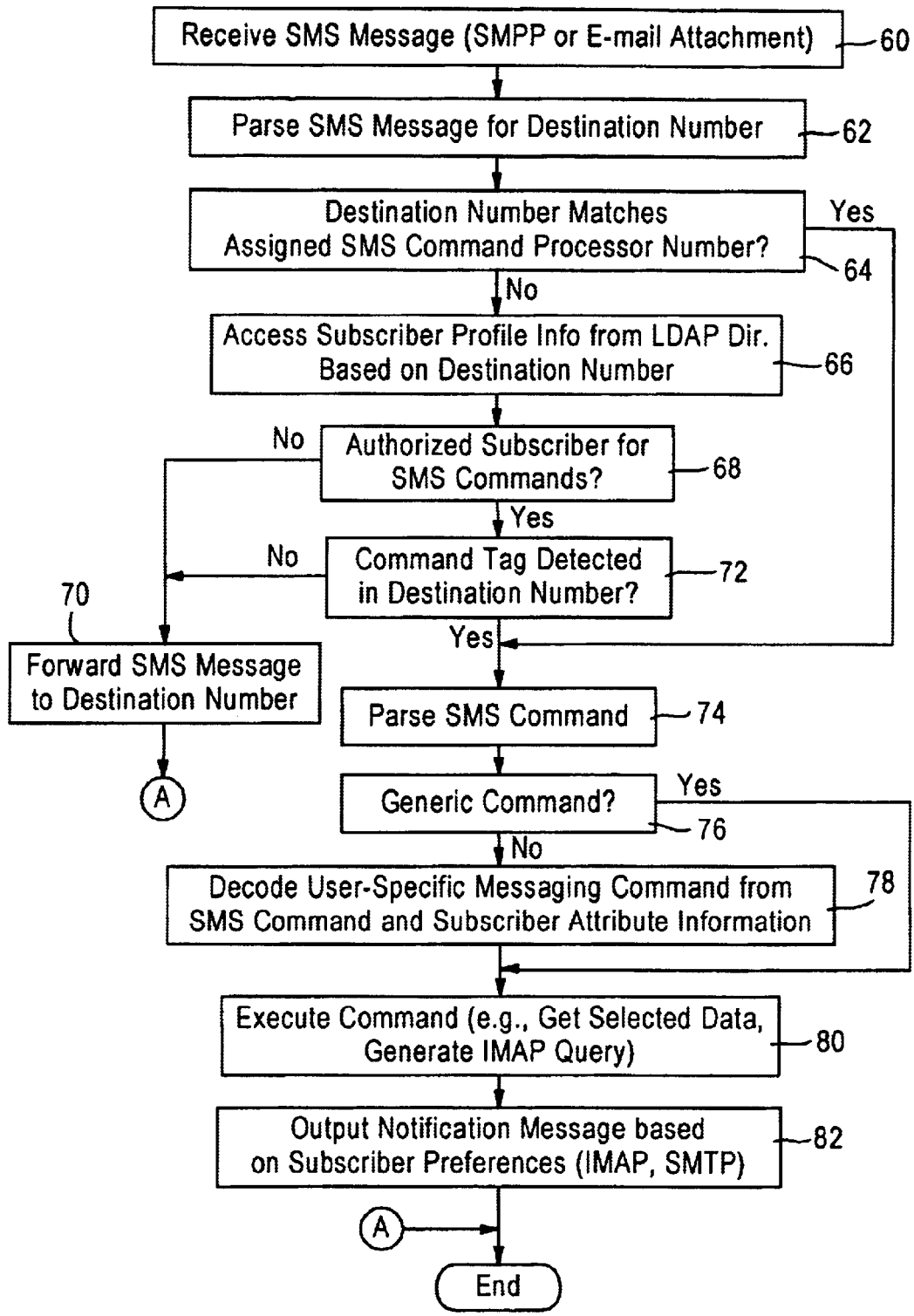
FIG. 3 is a diagram illustrating the method of performing messaging operations based on parsing an SMS message having a prescribed messaging command, according to an embodiment of the present invention.

FIG. 3 is a diagram illustrating SMS operations performed by the SMS command processor 24 in response to reception of an SMS message 42 having an SMS command 46, according to an embodiment of the present invention. The steps described in FIG. 3 can be implemented as executable code stored on a computer readable medium (e.g., a hard disk drive, a floppy drive, a random access memory, a read only memory, an EPROM, a compact disc, etc.).

The method begins in step 60, where the SMS command processor 24 receives the SMS message 42 according to a prescribed protocol. For example, the SMS command processor 24 of the messaging server 20 would receive the SMS message via the SMTP interface 50 according to SMPP protocol, whereas the SMS command processor 24 of the notification server 40 would receive the SMS message 42 as an e-mail attachment via an SMTP interface 52.

The SMS command processor 24 parses in step 62 the received SMS message 42 to obtain the destination number 44. If in step 64 the destination number 44 matches the assigned SMS command processor number, as illustrated with respect to the destination number 44a, the SMS command processor 24 can begin executing the prescribed messaging operation in step 74, described below. However if the destination number 44 does not match the assigned SMS command processor number, the SMS command processor 24 issues a query to the LDAP API 30a in step 66 to access the subscriber profile information based on the destination number 44. As described below, the subscriber profile information may include notification preferences, and user-specific messaging commands.

If the SMS command processor 24 determines in step 68 from the subscriber profile information that the subscriber is not authorized for SMS commands, the SMS command processor 24 handles the SMS message as a conventional SMS message in step 70 and forwards the SMS message to the destination number. However if in step 68 the subscriber is authorized for generating SMS commands, the SMS command processor 24 determines in step 72 whether a command tag 48 was detected. If no command tag was detected, the SMS message is forwarded in step 70. However if a command tag 48 is detected, indicating the presence of an SMS command 46, the SMS command processor 24 begins procedures to execute the messaging command 46.

The SMS command processor 24 parses the SMS command 46 in step 74. If in step 76 the SMS command processor 24 determines the command 46 is a generic command 46a, the SMS command processor 24 executes the command in step 80. However if in step 76 the parsed command is a user-specific messaging command 46b, the SMS command processor 24 decodes in step 78 the command 46b based on the list of user-specific messaging commands from the subscriber attribute information.

The SMS command processor 24 executes the appropriate command in step 80, and performs any necessary function calls, for example requesting the agent 34 to obtain the user-selected data, or issuing an IMAP query for a list of new messages. The SMS command processor 24, upon 29 obtaining all relevant data, outputs a notification message in step 82 based on the subscriber preferences, for example either to the notification server 40, to the subscriber's IMAP message store 22, or directly back to the subscriber's cellphone 12 in the form of an SMS message.

According to the disclosed embodiment, SMS messages can be used as a command interface by a subscriber, or by a resource configured for generating SMS messages, enabling execution of application operations based on the executable commands within the SMS message.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a server configured for executing messaging operations, the method comprising:

receiving a short message service (SMS) message;

parsing the SMS message for a prescribed messaging command, executing a prescribed messaging operation based on the prescribed messaging command; and accessing a subscriber directory, according to an open network protocol, for subscriber attribute information based on source information within the SMS message, the executing step including performing the prescribed messaging operation based on the subscriber attribute information.

2. The method of claim 1, wherein the subscriber attribute information specifies that the source information specifies a valid SMS subscriber authorized to send the prescribed messaging command using the SMS message.

3. The method of claim 1, wherein the executing step further includes determining the prescribed messaging operation based on decoding the prescribed messaging command relative to user-specific messaging commands obtained from the subscriber attribute information.

4. The method of claim 1, wherein the accessing step includes accessing the subscriber directory according to Lightweight Directory Access Protocol (LDAP).

5. A method in a server configured for executing messaging operations the method comprising:

receiving a short message service (SMS) message;

parsing the SMS message for a prescribed messaging command; and executing a prescribed messaging operation based on the prescribed messaging command;

wherein the executing step includes sending a request to a notification agent for generation of a prescribed message according to a selected notification protocol.

6. The method of claim 5, wherein the sending step includes sending the request to the notification agent according to SMTP protocol.

7. The method of claim 5, wherein the executing step further includes obtaining subscriber-selected external information, based on subscriber selections specified within retrieved subscriber attribute information, and inserting the obtained external information within the request.

8. A method in a server configured for executing messaging operations, the method comprising:

receiving a short message service (SMS) message;

parsing the SMS message for a prescribed messaging command; and executing a prescribed messaging operation based on the prescribed messaging command;

wherein the receiving step includes receiving the SMS message according to short message peer-to-peer (SMPP) protocol.

9. The method of claim 8, wherein the parsing step includes:

first parsing the SMS message for a telephone number field that specifies a presence of the prescribed messaging command; and obtaining the prescribed messaging command based on determining that the telephone number field specifies the presence of the prescribed messaging command.

10. The method of claim 9, wherein the parsing step further includes determining the presence of the prescribed messaging command based on the telephone number field corresponding to a prescribed telephone number assigned for SMS command processing.

11. The method of claim 9, wherein the parsing step further includes determining the presence of the prescribed messaging command based on the telephone number field specifying a valid subscriber telephone number and a prescribed tag that identifies the presence of the prescribed messaging command.

12. A method in a server configured for executing messaging operations, the method comprising:

receiving a short message service (SMS) message;

parsing the SMS message for a prescribed messaging command; and executing a prescribed messaging operation based on the prescribed messaging command;

wherein the receiving step includes receiving an e-mail message containing the SMS message;

the method further comprising accessing a subscriber directory, according to an open network protocol, for subscriber attribute information including a subscriber notification preference, the executing step including forwarding data within the SMS message to a subscriber according to the prescribed subscriber notification preference.

13. A server configured for executing messaging operations, the server including:

an interface configured for receiving a short message service (SMS) message according to a prescribed network protocol; and an SMS command processor configured for parsing the SMS message and executing a prescribed messaging operation based on detecting a prescribed messaging command within the SMS message;

wherein the interface is configured for receiving the SMS message according to at least one of short message peer-to-peer (SMPP) protocol and SMTP protocol as the prescribed network protocol.

14. A server configured for executing messaging operations, the server including:

an interface configured for receiving a short message service (SMS) message according to a prescribed network protocol;

an SMS command processor configured for parsing the SMS message and executing a prescribed messaging operation based on detecting a prescribed messaging command within the SMS message; and a subscriber directory resource configured for accessing subscriber attribute information from a subscriber directory according to an open network protocol, the SMS command processor configured for executing the prescribed messaging operation based on the subscriber attribute information.

15. The server of claim 14, wherein the SMS command processor is configured for decoding the prescribed messaging command based on user-specific messaging commands specified within the subscriber attribute information.

16. The server of claim 14, wherein the subscriber directory resource is configured for accessing the subscriber directory according to Lightweight Directory Access Protocol (LDAP) as the open network protocol.

17. The server of claim 14, further comprising an agent configured for obtaining subscriber-selected external information from a remote server according to a prescribed open network protocol, based on subscriber selections specified within the subscriber attribute information, the SMS command processor configured for executing the prescribed messaging operation based on retrieval of the subscriber-selected external information.

18. The server of claim 17, further comprising a messaging resource configured for outputting a notification message including the subscriber-selected external information, generated by the prescribed messaging operation, to an external server according to an IP-based protocol.

19. The server of claim 18, wherein the messaging resource is configured for outputting the notification message according to at least one of SMTP protocol and IMAP protocol.

20. A server configured for executing messaging operations, the server including:
   an interface configured for receiving a short message service (SMS) message according to a prescribed network protocol; and
   an SMS command processor configured for parsing the SMS message and executing a prescribed messaging operation based on detecting a prescribed messaging command within the SMS message;
   wherein the SMS command processor is configured for parsing the message for the prescribed messaging command based on detecting within the SMS message a telephone number field that specifies a presence of the prescribed messaging command.

21. The server of claim 20, wherein the SMS command processor detects the presence of the prescribed messaging command based on the telephone number field corresponding to a prescribed telephone number assigned for SMS command processing.

22. The server of claim 20, wherein the SMS command processor detects the presence of the prescribed messaging command based on the telephone number field specifying a valid subscriber telephone number and a prescribed tag that identifies the presence of the prescribed messaging command.

23. A computer readable medium having stored thereon sequences of instructions for receiving a short message service (SMS) message by a server, the sequences of instructions including instructions for performing the steps of:
   receiving a short message service (SMS) message;
   parsing the SMS message for a prescribed messaging command;
   executing a prescribed messaging operation based on the prescribed messaging command; and
   accessing a subscriber directory, according to an open network protocol, for subscriber attribute information based on source information within the SMS message, the executing step including performing the prescribed messaging operation based on the subscriber attribute information.

24. The medium of claim 23, wherein the subscriber attribute information specifies that the source information specifies a valid SMS subscriber authorized to send the prescribed messaging command using the SMS message.

25. The medium of claim 23, wherein the executing step further includes determining the prescribed messaging operation based on decoding the prescribed messaging command relative to user-specific messaging commands obtained from the subscriber attribute information.

26. The medium of claim 23, wherein the accessing step includes accessing the subscriber directory according to Lightweight Directory Access Protocol (LDAP).

27. A computer readable medium having stored thereon sequences of instructions for receiving a short message service (SMS) message by a server, the sequences of instructions including instructions for performing the steps of:
   receiving a short message service (SMS) message;
   parsing the SMS message for a prescribed messaging command; and
   executing a prescribed messaging operation based on the prescribed messaging command;
   wherein the executing step includes sending a request to a notification agent for generation of a prescribed message according to a selected notification protocol.

28. The medium of claim 27, wherein the sending step includes sending the request to the notification agent according to SMTP protocol.

29. The medium of claim 27, wherein the executing step further includes obtaining subscriber-selected external information, based on subscriber selections specified within retrieved subscriber attribute information, and inserting the obtained external information within the request.

30. A computer readable medium having stored thereon sequences of instructions for receiving a short message service (SMS) message by a server, the sequences of instructions including instructions for performing the steps of:
   receiving a short message service (SMS) message;
   parsing the SMS message for a prescribed messaging command; and
   executing a prescribed messaging operation based on the prescribed messaging command;
   wherein the receiving step includes receiving the SMS message according to short message peer-to-peer (SMPP) protocol.

31. The medium of claim 30, wherein the parsing step includes:
   first parsing the SMS message for a telephone number field that specifies a presence of the prescribed messaging command; and
   obtaining the prescribed messaging command based on determining that the telephone number field specifies the presence of the prescribed messaging command.

32. The medium of claim 31, wherein the parsing step further includes determining the presence of the prescribed messaging command based on the telephone number field corresponding to a prescribed telephone number assigned for SMS command processing.

33. The medium of claim 31, wherein the parsing step further includes determining the presence of the prescribed messaging command based on the telephone number field specifying a valid subscriber telephone number and a prescribed tag that identifies the presence of the prescribed messaging command.

34. A computer readable medium having stored thereon sequences of instructions for receiving a short message service (SMS) message by a server, the sequences of instructions including instructions for performing the steps of:
   receiving a short message service (SMS) message;
   parsing the SMS message for a prescribed messaging command; and
   executing a prescribed messaging operation based on the prescribed messaging command;
   wherein the receiving step includes receiving an e-mail message containing the SMS message;
   the medium further comprising instructions for performing the step of accessing a subscriber directory, according to an open network protocol, for subscriber attribute information including a subscriber notification preference, the executing step including forwarding data within the SMS message to a subscriber according to the prescribed subscriber notification preference.

35. A server comprising:
   means for receiving a short message service (SMS) message;

means for parsing the SMS message for a prescribed messaging command;

means for executing a prescribed messaging operation based on the prescribed messaging command; and means for accessing a subscriber directory, according to an open network protocol, for subscriber attribute information based on source information within the SMS message, the executing means performing the prescribed messaging operation based on the subscriber attribute information.

36. The server of claim 35, wherein the subscriber attribute information specifies that the source information specifies a valid SMS subscriber authorized to send the prescribed messaging command using the SMS message.

37. The server of claim 35, wherein the executing means is configured for determining the prescribed messaging operation based on decoding the prescribed messaging command relative to user-specific messaging commands obtained from the subscriber attribute information.

38. The server of claim 35, wherein the accessing means is configured for accessing the subscriber directory according to Lightweight Directory Access Protocol (LDAP).

39. A server comprising:

means for receiving, a short message service (SMS) message;

means for parsing the SMS message for a prescribed messaging command; and means for executing a prescribed messaging operation based on the prescribed messaging command;

wherein the executing means is configured for sending a request to a notification agent for generation of a prescribed message according to a selected notification protocol.

40. The server of claim 39, wherein the sending means is configured for sending the request to the notification agent according to SMTP protocol.

41. The server of claim 39, wherein the executing means includes means for obtaining subscriber-selected external information, based on subscriber selections specified within retrieved subscriber attribute information, the executing means inserting the obtained external information within the request.

42. A server comprising:

means for receiving a short message service (SMS) message;

means for parsing the SMS message for a prescribed messaging command; and means for executing a prescribed messaging operation based on the prescribed messaging command;

wherein the receiving means is configured for receiving the SMS message according to short message peer-to-peer (SMPP) protocol.

43. The server of claim 42, wherein the parsing means is configured for:

first parsing the SMS message for a telephone number field that specifies a presence of the prescribed messaging command; and obtaining the prescribed messaging command based on determining that the telephone number field specifies the presence of the prescribed messaging command.

44. The server of claim 43, wherein the parsing means is configured for determining the presence of the prescribed messaging command based on the telephone number field corresponding to a prescribed telephone number assigned for SMS command processing.

45. The server of claim 43, wherein the parsing means is configured for determining the presence of the prescribed messaging command based on the telephone number field specifying a valid subscriber telephone number and a prescribed tag that identifies the presence of the prescribed messaging command.

46. A server comprising:

means for receiving a short message service (SMS) message;

means for parsing the SMS message for a prescribed messaging command; and means for executing a prescribed messaging operation based on the prescribed messaging command;

wherein the receiving means is configured for receiving an e-mail message containing the SMS message; the server further comprising means for accessing a subscriber directory, according to an open network protocol, for subscriber attribute information including a subscriber notification preference, the executing means configured for forwarding data within the SMS message to a subscriber according to the prescribed subscriber notification preference.

* * * * *